United States Patent [19]

Nakatsuma

[11] Patent Number: 5,142,525
[45] Date of Patent: Aug. 25, 1992

[54] COMMUNICATION TERMINAL APPARATUS

[75] Inventor: Takuji Nakatsuma, Machida, Japan

[73] Assignee: Canon Kabushiki Kaisha, Tokyo, Japan

[21] Appl. No.: 662,316

[22] Filed: Feb. 21, 1991

Related U.S. Application Data

[63] Continuation of Ser. No. 283,852, Dec. 13, 1988, abandoned.

[30] Foreign Application Priority Data

Dec. 24, 1987 [JP] Japan ................... 62-325313

[51] Int. Cl.$^5$ ................ H04J 3/14; H04M 3/48
[52] U.S. Cl. ................... 370/13; 370/79; 370/110.1; 379/93; 379/209
[58] Field of Search ............ 370/58.1, 58.2, 60, 370/61, 79, 80, 85.6, 85.7, 94.1, 95.1, 95.2, 110.1; 379/93, 94, 96, 134, 164, 165, 245, 269, 274, 277, 381

[56] References Cited

U.S. PATENT DOCUMENTS

| | | | |
|---|---|---|---|
| 4,166,929 | 9/1979 | Sheinbein | 379/209 |
| 4,209,668 | 6/1980 | Weinberger et al. | 379/188 |
| 4,672,662 | 6/1987 | Hishino et al. | 370/58.1 |
| 4,736,364 | 4/1988 | Basso et al. | 370/110.1 |
| 4,755,985 | 7/1988 | Jayapalan et al. | 370/60 |
| 4,803,679 | 2/1989 | Shimizu | 370/95 |
| 4,870,678 | 9/1989 | Adachi | 379/93 |
| 4,878,216 | 10/1989 | Yunoki | 370/60 |
| 4,888,766 | 12/1989 | Ogasawara | 370/110.1 |
| 4,965,795 | 10/1990 | Coffelt et al. | 370/110.1 |
| 4,989,202 | 1/1991 | Soto et al. | 370/110.1 |

FOREIGN PATENT DOCUMENTS

| | | |
|---|---|---|
| 0060517 | 11/1982 | European Pat. Off. . |
| 0178111 | 1/1985 | European Pat. Off. . |
| 2166025 | 4/1986 | United Kingdom ............ 370/110.1 |

OTHER PUBLICATIONS

Data Communications, vol. 16, No. 11, Oct. 1987, pp. 237–255, "Standards Makers Cementing ISDN Subnetwork Layers".

Electrical Design News, vol. 32, No. 2, Jan. 22, 1987, pp. 167–174, O'Toole, "ISDN terminals simplify data transmissions".

Nachrichtentechnik Electronik, vol. 37, No. 10, 1987, pp. 368–374, Winkler et al., "ISDN-Konzept".

Ericsson Review, vol. 61, pp. 14–19, May 1984, "Voice and data workstations and services in the ISDN", Ericcson et al.

Proc. National Communications Forum, vol. 40, part I, 1986, pp. 596–604, "Basic rate interface capabilities to support ISDN terminals", Chriss et al.

Proc. Int. Switching Symposium, May 7–11, 1984, "Implementation and experience of ISDN in AXE", Como et al.

Philips Telecommunication Review, vol. 43, No. 2, Jun. 1985, pp. 150–163, Hesdahl, "Digital voice/data terminals and data-terminal adaptors".

Primary Examiner—Douglas W. Olms
Assistant Examiner—Alpus H. Hsu
Attorney, Agent, or Firm—Fitzpatrick, Cella, Haper & Scinto

[57] ABSTRACT

Disclosed is a communication terminal apparatus for use in a communication system in which at least one line having a plurality of channels is used by a plurality of communication apparatuses (4, 5, 6, 7, 8, 9, 10), wherein when all the information channels are engaged, the idle condition thereof is automatically monitored, and a call is originated when the idle condition is detected, thereby eliminating the wastefulness of operation and improving the efficiency of the line. In particular, when the communication terminal apparatus is connected to a subscriber's line (3) of an ISDN system, communication is effected by using B channels, and if all the B channels are found to be busy upon origination of a call, the idle condition of one of the B channels is monitored from the contents of a D channel, a call being originated again when a B channel becomes idle.

8 Claims, 5 Drawing Sheets

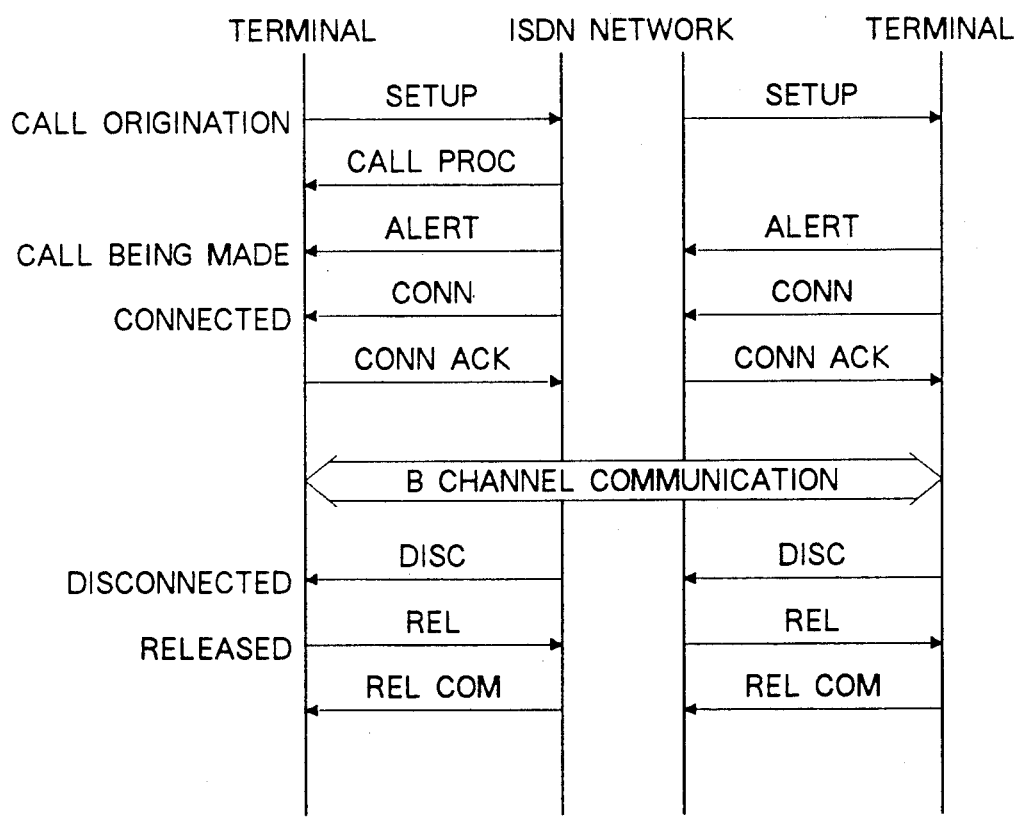

COMMUNICATION TERMINAL APPARATUS

This application is a continuation of application Ser. No. 07/283,852 filed Dec. 13, 1988, now abandoned.

BACKGROUND OF THE INVENTION

1. Field of the Invention

The present invention relates to a communication terminal apparatus, and more particularly to a communication terminal apparatus for use in a communication system in which at least one line having a plurality of channels is used by a plurality of communication apparatuses.

2. Description of the Prior Art

Conventionally, an ISDN (integrated services digital network) system is known as a communication system of this type. For instance, in a basic interface of a user network of this ISDN line, one line is provided with three communication channels comprising two information channels (B channels) and one control channel (D channel), and a maximum of eight terminals are connected to this line. When a communication line is not in use, it is possible to effect communication in response to a request for communication from each terminal.

When a small number of lines are utilized by a plurality of terminals as in the case of the ISDN system, even if one terminal attempts communication, it is impossible to communicate when all the information channels are busy. At that time, there is a drawback in that it is impossible for the user to know whether or not communication is possible unless a request for communication is actually made on each such occasion.

SUMMARY OF THE INVENTION

Accordingly, an object of the present invention is to provide a improved communication terminal apparatus, thereby overcoming the above-described drawback of the conventional art. Another object of the present invention is to provide a communication terminal apparatus in which a request for communication is automatically made when an information channel is not in use, so as to eliminate the wastefulness of operation.

A further object of the present invention is for the monitoring means to monitor the not-in-use condition of an information channel, when all the information channels are engaged, and for the call originating means to originate a call when the not-in-use condition is detected.

A further object of the present invention is to provide a communication terminal apparatus which is capable of making a request for communication automatically when an information channel is not in use, thereby eliminating the wastefulness of operation and improving the efficiency of the line.

The above and other objects, advantages and features of the present invention will become more readily apparent from the following specification.

BRIEF DESCRIPTION OF THE DRAWINGS

FIG. 4 is a diagram illustrating an example of the contents of a call origination acceptance message;

FIG. 5 is a diagram illustrating an example of a sequence of a common channel-type protocol.

DESCRIPTION OF THE PREFERRED EMBODIMENT

Referring now to the accompanying drawings, a detailed description will be given of an embodiment of the present invention. In this embodiment, a description will be given, by way of an example, of a digital facsimile apparatus which is connected to a basic interface of an ISDN system. In addition, it is assumed that a common channel-type protocol is used as a protocol.

Figure 3:
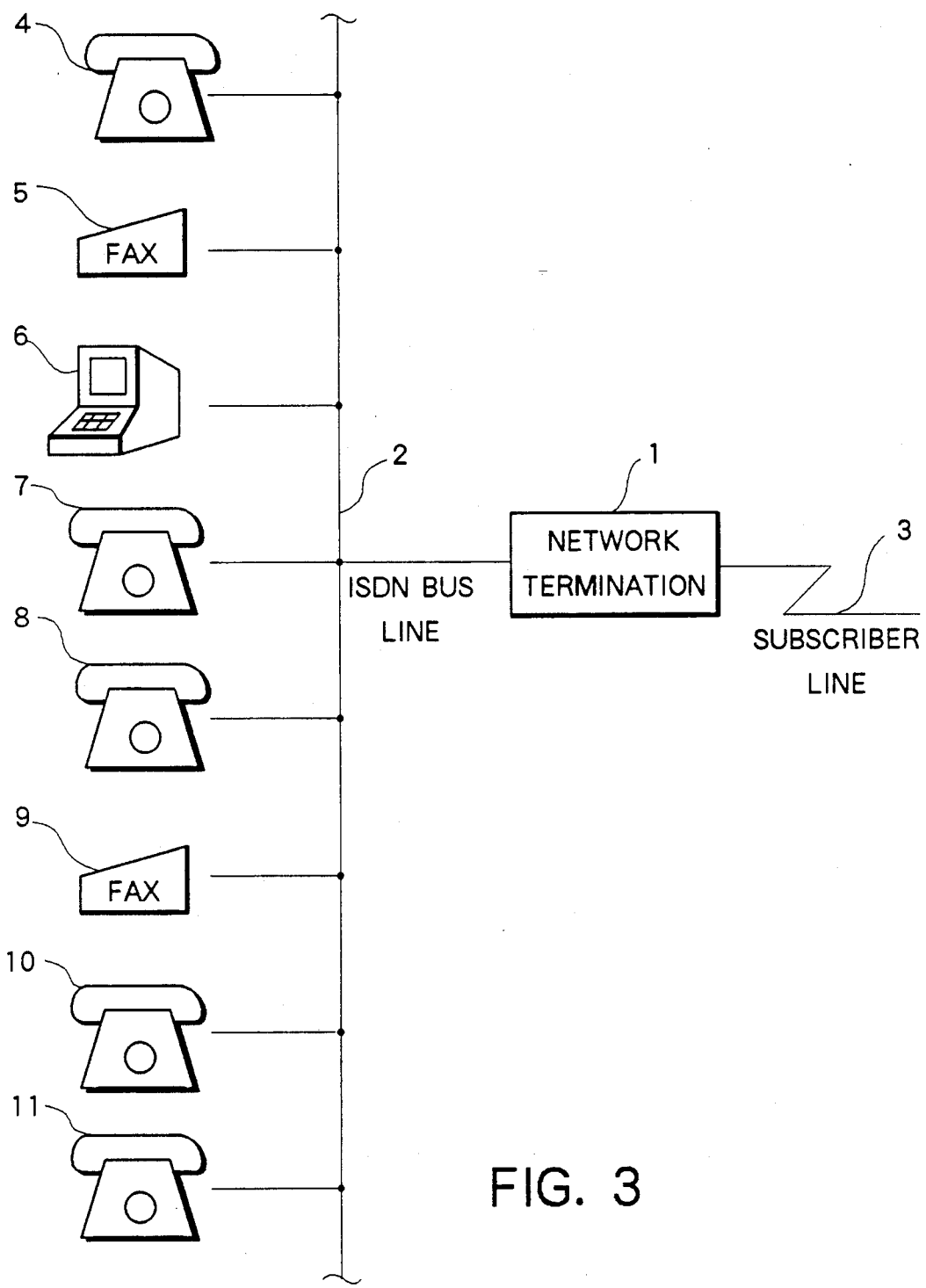
FIG. 3 is a diagram illustrating a configuration of system in which communication terminal apparatuses in accordance with the embodiment are connected to an ISDN system.

FIG. 3 is a diagram illustrating a configuration of a system in which communication terminal apparatuses in accordance with this embodiment are connected to an ISDN system. As shown in the drawing, this system comprises the following: a network termination 1; an ISDN bus line 2 which connects the network termination 1 to a plurality of terminal apparatuses; a subscriber's line 3 which connects an ISDN exchanger (not shown) to the network termination 1; general digital telephone sets 4, 7, 8, 10, 11; a telex apparatus 6; and digital facsimile apparatuses 5, 9 in accordance with this embodiment.

Figure 1:
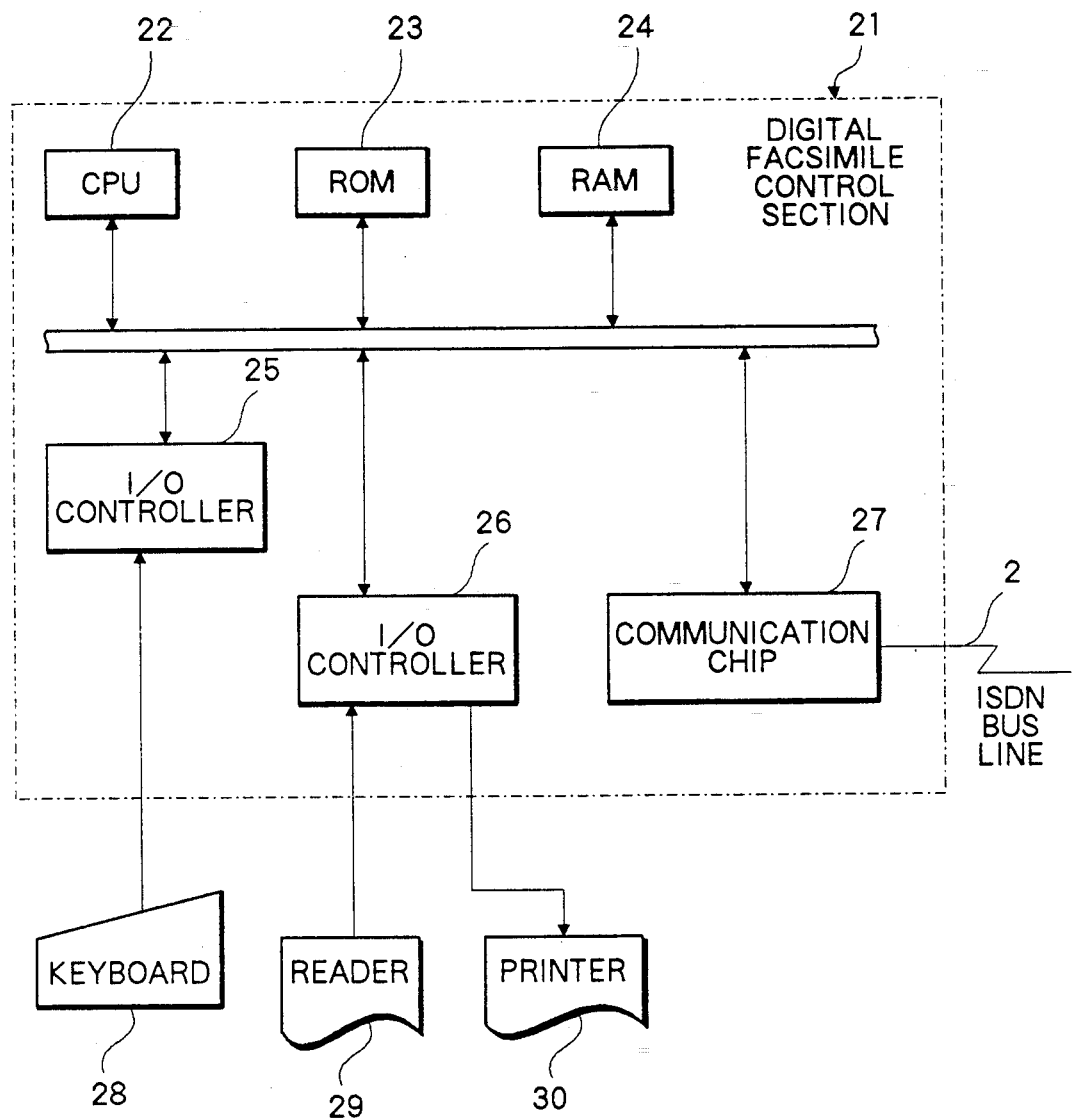
FIG. 1 is a block diagram illustrating a configuration of a digital facsimile apparatus in accordance with an embodiment of the present invention.

FIG. 1 is a block diagram illustrating a configuration of a digital facsimile apparatus in accordance with this embodiment. In FIG. 1, a digital facsimile apparatus controlling section 21 comprises the following components: and EPROM 23 for storing a processing program; a central processor 22 (CPU 22) for effecting processing in accordance with the processing program stored in the EPROM 23; a RAM 24 for storing data; a keyboard 28; an I/O controller 25 for controlling the keyboard 28; a reader 29 for reading an image; a printer 30 for outputting an image; an I/O controller 26 for controlling the reader 29 and the printer 30; and a communication chip 27 for an interface with the ISDN bus line 2.

Figure 2:
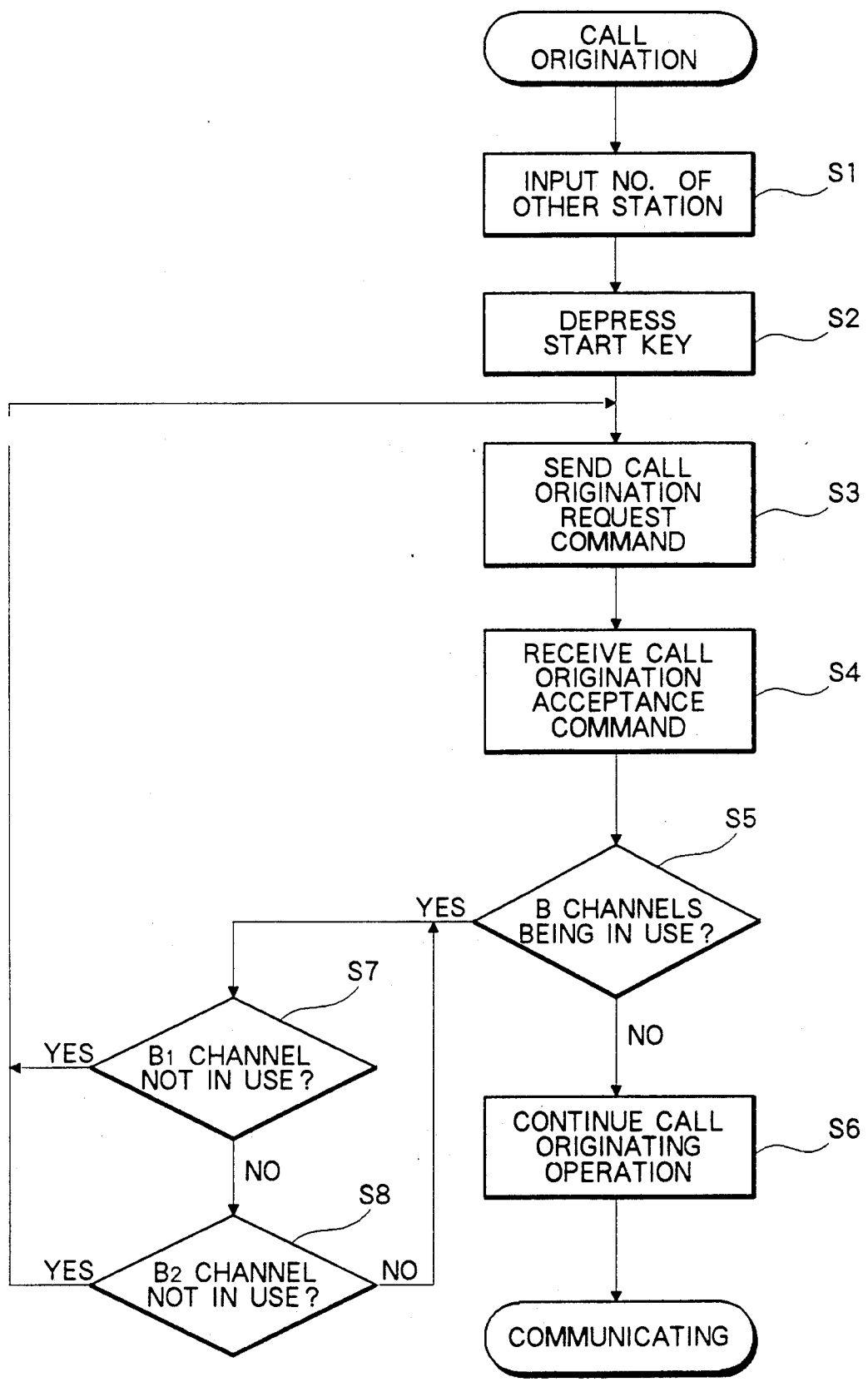
FIG. 2 is a flowchart illustrating the operation of the digital facsimile apparatus in accordance with the embodiment of the present invention.

A description will now be given of the operation of the above-described embodiment. FIG. 2 is a flowchart illustrating the operation of a digital facsimile apparatus in accordance with this embodiment. In this embodiment, it is assumed that the ISDN line is provided with a basic interface, one D channel and two B channels.

When a call is originated in a digital facsimile apparatus, in step S1 the operator first inputs the number of the other office from numeric pad 34 of the keyboard 28. In Step S2, the start key 32 is depressed to complete a call originating operation. In Step S3, the digital facsimile apparatus concerned sends a call origination request command, and in Step S4 a call origination acceptance command is received in response to the call origination request command.

Subsequently, in Step S5 a parameter included in the call origination acceptance message is analyzed to determine whether or not either of the B channels is in use. FIG. 4 illustrates an example of the contents of the call origination acceptance message. In FIG. 4, the protocol identifier shows that this message is a common channel-type protocol in an ISDN line. The call number is one peculiar to a terminal apparatus, and the type of message shows that this message is a call origination acceptance message. Information on whether or not a B channel is in use is included in the channel identifier. When there is a B channel which is not in use, in Step S6 a call originating operation in continuously effected, and a communicating condition is thereby established.

If it is determined in Step S5 that all the B channels are in use, the sequence of signals of the D channel is monitored in Step S7 to determine whether or not a B1 channel is in use. In Step S8, a determination is made in a similar manner as to whether or not a B2 channel is in use. FIG. 5 shows a signal sequence based on a general common channel-type protocol. In this embodiment, when disconnection (DISC) and release (REL) sequentially occur in the same B channel on the basis of a message from the D channel, it is determined that neither of the B channels is in use.

Figure 6:
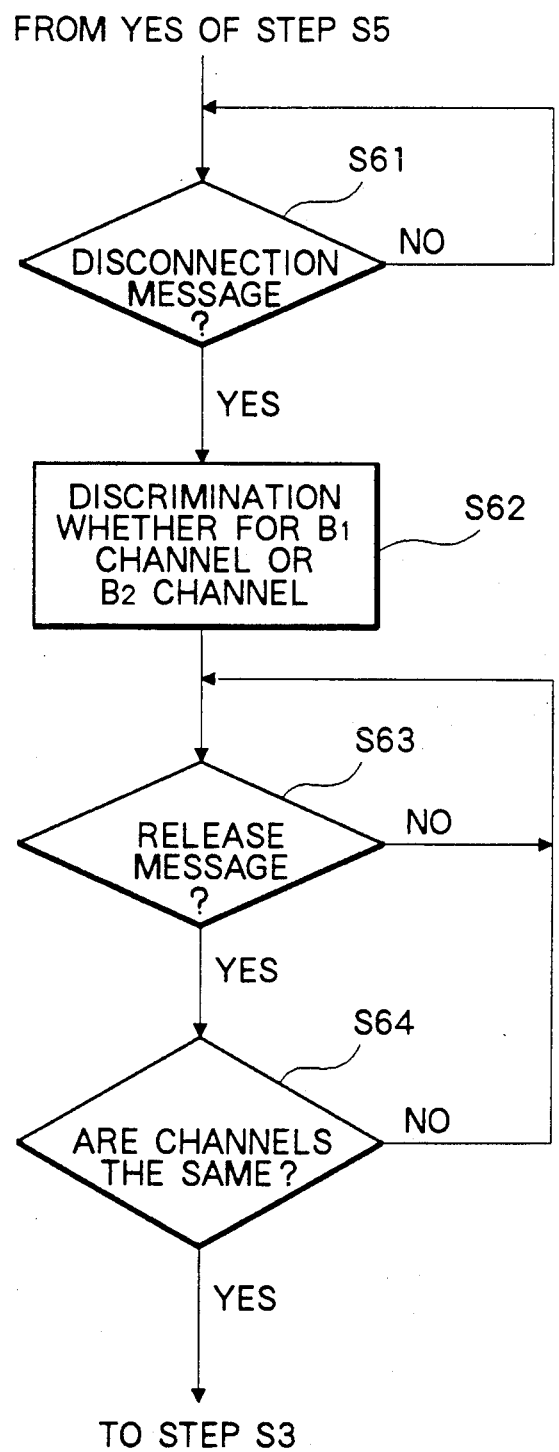
FIG. 6 is a flowchart illustrating an example in which the not-in-use condition of a B channel is monitored from a D channel.

FIG. 6 is a flowchart which illustrates another form of flow for monitoring the not-in-use condition of either of the B channels from the D channel in Steps S7 and S8 shown in FIG. 2. In Step S61, a DISC message from the D channel is monitored and, if there is a DISC message, a determination is made in Step S62 as to whether the DISC message is for the B1 or B2 channel. Subsequently, a REL message is monitored from the D channel in Step S63, and if there is a REL message, a determination is made in Step S64 as to whether or not the B channel concerning that REL message is the same B channel as that concerning the DISC message determined in Step S62. If it is the same, it is determined that that B channel is not in use. If it is not the same, the operation returns to Step S63 and waits for an ensuing REL message. It should be noted that the flowchart shown in FIG. 6 is one example of determination, and, for example, only the REL message may be monitored.

At the time when it is confirmed in Steps S7 and S8 that neither of the B channels is in use, the operation returns to Step S3, and a call origination request message is sent again in Steps S3 to S5, a call origination acceptance message is received to confirm the not-in-use or idle state condition of the B channels. Since neither of the B channels is in use this time, the operation proceeds to Step S6, and a call originating operation is carried out continuously, thereby establishing a communicating condition.

As described above, in accordance with this embodiment, when all the B channels on the calling party's side are busy, since there is a function which allows a communication terminal apparatus to monitor the state of use of the B channels, and a call is automatically originated again when neither of the B channels is in use, the burden placed on the operator can be alleviated, thereby making it possible to improve the efficiency of the line.

In the above-described embodiment, if it is determined that neither of the B channels is in use, the monitoring of the B channels is effected in Steps S7 and S8 by monitoring the sequence of the D channel. However, an arrangement may be alternatively provided such that the operation returns directly to step S3 without performing Steps S7 and S8, a call origination request message is repeatedly transmitted, a call origination acceptance message is received on each such occasion, a parameter is then analyzed, and only when either of the B channels is not in use, the operation proceeds to the continuation of the call originating operation in Step S6.

In addition, although a description has been given of a case where the not-in-use condition of either of the B channels is monitored, the not-in-use condition of the D channels can be similarly monitored in the case of terminal of, for example, a packet exchange mode in which the D channel is used for transmission of information.

Furthermore, although in this embodiment a description has been given by taking a digital facsimile apparatus as an example, the terminal apparatus is not restricted to the same.

While but one embodiment of the present invention has been described, it will be apparent to those skilled in the art that various modifications and variations may be made therein without departing from the spirit and scope of the invention as claimed.

What is claimed is:

1. A communication terminal apparatus for use in a communication system in which at least one line having a plurality of channels is used by a plurality of communication apparatuses for connecting each communication terminal apparatus with a network, said communication terminal apparatus comprising:
    call originating means for originating an initial call to the network through a line corresponding to a call origination request directed outside and inputted in the communication terminal apparatuses; and
    means for controlling processing of the call to the network including:
    monitoring means for monitoring the idle state of the plurality of channels between the communication terminal apparatus and the network using the line after it is found from the response through the line to the initial call to the network that there is no channel through which the initial call can be transmitted to the network because all channels of the line are busy; and
    means for causing the call to the network to be originated again through the line when said monitoring means detects the idle state condition of one or more of the plurality of channels.

2. A communication terminal apparatus according to claim 1, wherein means for inputting a request for call origination is provided, and when said request for call origination is input, said monitoring means monitors the idle state condition of said plurality of channels.

3. A communication terminal apparatus according to claim 1, wherein said line is a digital communication line.

4. A communication terminal apparatus for use in a communication system in which at least one line having a plurality of channels is used by a plurality of communication apparatuses, said communication terminal apparatus comprising:
    call originating means for originating an initial call to a network corresponding to a call origination request directed outside and inputted in the communication terminal apparatuses; and
    means for controlling processing of the call including;
    monitoring means for monitoring the idle state of the plurality of channels after it is found from the response to the initial call that all channels are busy; and
    means for causing the call to be originated again when said monitoring means detects the idle state condition of one or more of the plurality of channels, wherein said communication terminal apparatus is connected to a subscriber's line of an ISDN system, communication being effected by using B channels; and wherein, if all the B channels are found to be busy upon origination of a call, the idle state conditions of the B channels are monitored from the message signals of a D channel which contain a disconnection message and a release message, and when it is detected on the basis of the disconnection message and the following release message that one or more of said B channels is in the idle state condition, the call is originated again.

5. A communication terminal apparatus according to claim 4, wherein, when a B channel disconnected is is the same as a B channel released, it is recognized that at least one of said B channels is in the idle state.

6. A communication terminal apparatus connected to a line of an ISDN having a D channel and a plurality of B channels comprising:

input means for inputting a terminal number of another communication terminal and operating a call origination;

call originating means for originating a call to the ISDN through the line of the ISDN; and control means for controlling the apparatus including;

means for monitoring using the line whether one or more of the plurality of B channels between the communication terminal apparatus and the ISDN is released in case it is found that there is no B channel through which the call can be transmitted to the ISDN because all B channels are busy when a call origination is operated by using said input means; and means for causing the call to the ISDN to be originated again through the line by said call originating means when the idle state of the one or more of the B channels is detected.

7. A communication terminal apparatus according to claim 6, wherein said call originating means originates the call by using the D channel of the ISDN, and said monitoring means detects the idle state of one of the plurality of B channels based on the monitoring of the D channel of the ISDN.

8. A communication terminal apparatus according to claim 7, wherein said monitoring means monitors the D channel until detecting the idle state of one of the plurality of B channels.

* * * * *

UNITED STATES PATENT AND TRADEMARK OFFICE
CERTIFICATE OF CORRECTION

PATENT NO. : 5,142,525
DATED : August 25, 1992
INVENTOR(S) : TAKUJI NAKATSUMA

It is certified that error appears in the above-identified patent and that said Letters Patent is hereby corrected as shown below:

Title page:

IN [56] REFERENCES CITED

Under U.S. PATENT DOCUMENTS,
"4,672,662  6/1987  Hishino et al." should read
--4,672,662  6/1987  Nishino et al.--.

Under OTHER PUBLICATIONS,
"experience" should read --experiences-- and
"adaptors"." should read --adapters".--.

COLUMN 3

Line 7, "in" should read --is--.
Line 33, "that" should read --the--.

COLUMN 5

Line 18, "is" (second occurrence) should be deleted.

Signed and Sealed this

Ninth Day of November, 1993

Attest:

BRUCE LEHMAN

Attesting Officer     Commissioner of Patents and Trademarks